(12) United States Patent
Gregg et al.

(10) Patent No.: US 11,592,612 B2
(45) Date of Patent: Feb. 28, 2023

(54) IN-FIBER OFFSET TO ANNULUS CONVERTER

(71) Applicant: Lumentum Operations LLC, San Jose, CA (US)

(72) Inventors: Patrick Gregg, Sunnyvale, CA (US); Martin H. Muendel, Oakland, CA (US); Richard D. Faulhaber, San Carlos, CA (US); James J. Morehead, Oakland, CA (US); Jeff Gregg, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 91 days.

(21) Appl. No.: 17/190,207

(22) Filed: Mar. 2, 2021

(65) Prior Publication Data

US 2022/0209486 A1    Jun. 30, 2022

Related U.S. Application Data

(60) Provisional application No. 63/132,234, filed on Dec. 30, 2020.

(51) Int. Cl.
*G02B 6/02* (2006.01)
*G02B 6/036* (2006.01)
*H01S 3/067* (2006.01)

(52) U.S. Cl.
CPC ......... *G02B 6/02042* (2013.01); *G02B 6/036* (2013.01); *G02B 6/03611* (2013.01); *H01S 3/06729* (2013.01)

(58) Field of Classification Search
None
See application file for complete search history.

(56) References Cited

U.S. PATENT DOCUMENTS

| | | | |
|---|---|---|---|
| 10,215,913 B2 * | 2/2019 | Sasaki | G02B 6/02042 |
| 11,351,633 B2 * | 6/2022 | Kangastupa | G02B 6/262 |
| 11,391,603 B2 * | 7/2022 | Matsushita | G02B 6/02042 |

FOREIGN PATENT DOCUMENTS

| | | | |
|---|---|---|---|
| CN | 109752790 A | * | 5/2019 |
| WO | WO-2018217297 A1 | * | 11/2018 |

OTHER PUBLICATIONS

Deng et al., Machine translation of CN-109752790-A, May 2019. (Year: 2019).*

* cited by examiner

*Primary Examiner* — Michelle R Connelly
(74) *Attorney, Agent, or Firm* — Harrity & Harrity, LLP (57) ABSTRACT

In some implementations, a waveguide may comprise an inner core to receive a first beam and an outer core surrounding the inner core to receive a second beam that is displaced from the first beam by an offset. The outer core may comprise a beam guiding region that rotationally expands over a length of the waveguide into an annulus that concentrically surrounds the inner core or a partial annulus that partially surrounds the inner core. For example, the beam guiding region may be defined by one or more low refractive index features that have a varied orientation and/or a varied shape over the length of the waveguide such that the second beam enters the waveguide as an offset beam and exits from the waveguide as a ring-shaped beam or a partial ring-shaped beam.

20 Claims, 7 Drawing Sheets

IN-FIBER OFFSET TO ANNULUS CONVERTER

CROSS-REFERENCE TO RELATED APPLICATION

This Patent Application claims priority to U.S. Provisional Patent Application No. 63/132,234, filed on Dec. 30, 2020, and entitled "IN-FIBER OFFSET TO ANNULUS CONVERTER." The disclosure of the prior Application is considered part of and is incorporated by reference into this Patent Application.

TECHNICAL FIELD

The present disclosure relates generally to beam shaping and to a waveguide that includes a rotationally expanding beam guiding region to conserve a beam parameter product associated with an offset beam that is gradually converted to an annulus or ring-shaped beam.

BACKGROUND

In an optical system, beam quality generally refers to a measure of how tightly a laser beam can be focused under certain conditions (e.g., with a limited beam divergence). For example, a high beam quality implies smooth wavefronts (e.g., a low phase variation across the beam profile) such that focusing the beam with a lens enables the beam to be focused tightly. On the other hand, a beam with poor beam quality may have scrambled wavefronts that make beam focusing more difficult (e.g., the beam divergence for a given spot size is increased). One metric that is often used to quantify beam quality is a beam parameter product (BPP), which is defined as the product of the beam radius (measured at the beam waist) and the beam divergence half-angle (measured in the far field). In general, beam quality decreases as the BPP value increases and vice versa (e.g., a higher BPP is associated with a lower beam quality and a lower BPP is associated with a higher beam quality), where the minimum achievable BPP value is $\lambda/\pi$, which corresponds to an ideal Gaussian beam with a wavelength $\lambda$. For example, the minimum possible BPP value for a beam that has a 1064 nanometer (nm) wavelength is about 0.339 millimeters times milliradians (mm-mrad). In some cases, the BPP may remain unchanged or may increase minimally (e.g., does not get worse) when a beam is sent through non-aberrative optics, such as a thin lens (e.g., if the lens generates a focus with a smaller radius or a larger radius at the beam waist, the beam divergence will increase or decrease correspondingly). However, non-ideal optics can lead to a significant increase in the BPP value, which can spoil the beam quality. For example, the BPP value can significantly increase in cases where one or more optical components cause the beam radius to increase without a corresponding decrease in the beam divergence half-angle.

SUMMARY

In some implementations, a waveguide includes an inner core arranged to receive a first beam; and an outer core surrounding the inner core and arranged to receive a second beam that is displaced from the first beam by an offset, wherein the outer core comprises a beam guiding region that rotationally expands over a length of the waveguide into an annulus that concentrically surrounds the inner core or a partial annulus that partially surrounds the inner core.

In some implementations, an optical system includes a beam router configured to generate one or more of a first beam or at least one second beam that is displaced from the first beam by an offset; a feeding fiber comprising an inner core to transmit the first beam and at least one annular outer core concentrically surrounding the inner core to transmit the at least one second beam; and an intermediary waveguide arranged between the beam router and the feeding fiber, wherein the intermediary waveguide comprises: an inner core arranged to receive the first beam; and at least one outer core surrounding the inner core and arranged to receive the at least one second beam that is displaced from the first beam by the offset, wherein the at least one outer core of the intermediary waveguide comprises a beam guiding region that rotationally expands over a length of the intermediary waveguide into an annulus that concentrically surrounds the inner core or a partial annulus that partially surrounds the inner core.

In some implementations, a method for fabricating a waveguide includes receiving a structure that comprises a central core and one or more outer cores concentrically surrounding the central core, wherein the structure comprises a rotationally symmetric fiber or preform; and forming, in each of the one or more outer cores concentrically surrounding the central core, a beam guiding region that rotationally expands over a length of the respective outer core into an annulus that concentrically surrounds the central core or a partial annulus that partially surrounds the inner core.

DETAILED DESCRIPTION

The following detailed description of example implementations refers to the accompanying drawings. The same reference numbers in different drawings may identify the same or similar elements.

Figure 1:
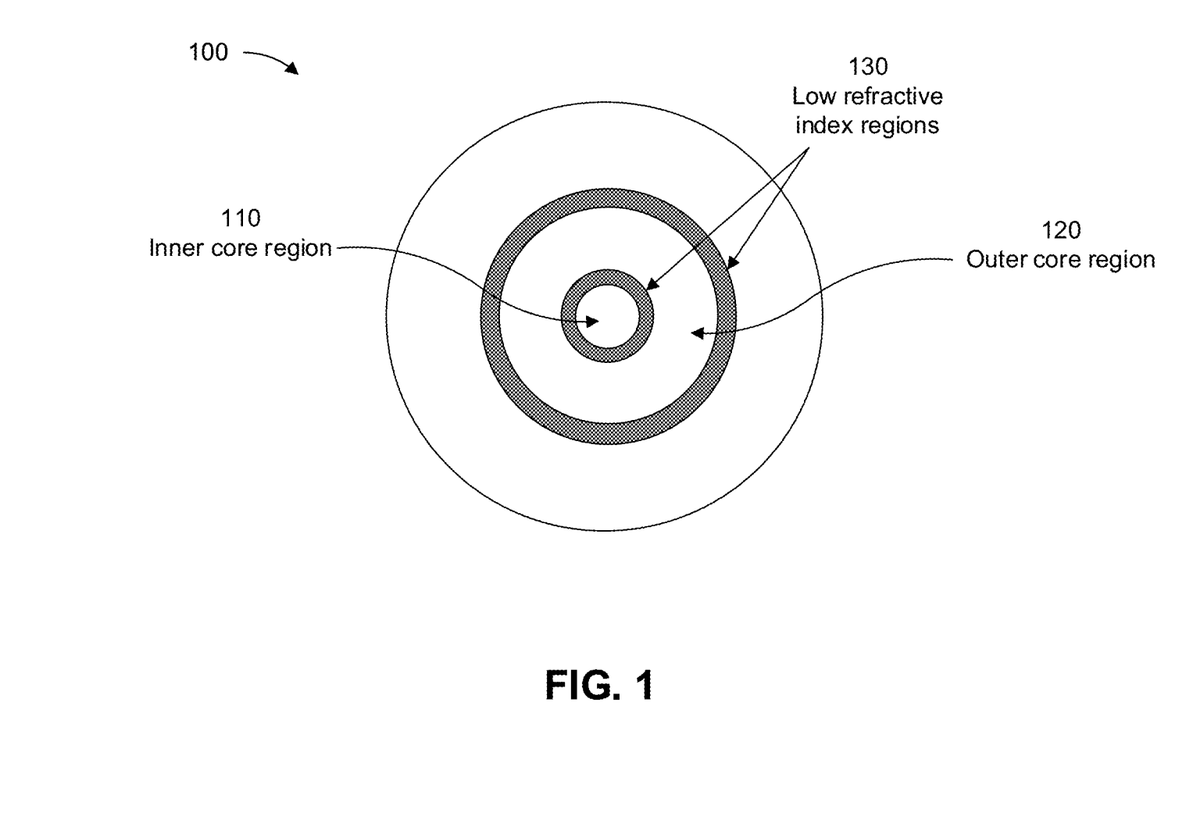
FIG. 1 is a diagram of an example multi-core feeding fiber.

For high power variable or multi-state beam shaping applications (e.g., high power material processing), actuation is a challenging issue. The ability to change states on-demand generally requires a mechanism to re-route or otherwise change a multi-kilowatt (kW) beam at relatively high speed (e.g., a millisecond (ms) time scale) without introducing loss. One technique to re-route or otherwise change a multi-kW beam is to displace a beam with respect to a target fiber in free space by use of a coupler box or a similar mechanism (e.g., with the use of steering mirrors, and/or other free space geometrical optics, optical phase plates, and/or the like). Additionally, or alternatively, the beam may be displaced in-fiber by applying bends to a particular fiber type. For instance, FIG. 1 is a diagram of an example multi-core feeding fiber 100 that includes two (or more) concentric cores. For example, as shown, the multi-core feeding fiber 100 includes an inner core 110 and an outer core 120, which generally have a high refractive index, and the multi-core feeding fiber 100 further includes low refractive index regions 130 (e.g., cladding layers) corresponding to the shaded areas that define internal and/or external interfaces of the concentric cores 110, 120. Accordingly, in one technique, a beam may be displaced with respect to a target fiber in free space or in-fiber in order to steer a beam into the inner core 110 in the multi-core feeding fiber 100 or into the outer core 120 to deliver beams that have different sizes, different shapes, and/or different beam parameter products (BPPs), among other examples.

For example, given an input beam that is roughly the size and shape of the inner core 110, the input beam may be coupled into the inner core 110 or the input beam may be shifted and moved over by an offset in order to couple the input beam into the outer core 120. In cases where the input beam is shifted and coupled into the outer core 120, the input beam may expand to fill the annular region defined by the outer core 120 such that an annular (ring-shaped) beam is delivered to a workpiece at an output end of the multi-core feeding fiber 130. Although a beam may be displaced in free space (e.g., using a coupler box) or in-fiber (e.g., by applying bends to a particular fiber type) in order to re-route or otherwise change states in a multi-kW beam, the displacement technique has a fundamental limitation. For example, assuming that the beam being steered is approximately the size of the inner core 110, the BPP of the beam launched into the region of the inner core 110 will be conserved (e.g., will not significantly increase because the beam radius and divergence half-angle remain relatively constant). However, the beam steered into the outer core 120 will be significantly under-sized with respect to the area of the fiber excited by the beam (e.g., similar to an offset-splice between mis-sized fibers), which can result in a rapid increase in the BPP for the beam steered into the outer core 120. For example, in the multi-core feeding fiber 100 shown in FIG. 1, the diameter of the outer core 120 is geometrically at least triple the diameter of the inner core 110, and more typically four or more times greater to account for size tolerances and/or the thickness of the low refractive index region 130 (e.g., cladding layer) between the inner core 110 and the outer core 120.

Accordingly, because the beam that is steered into the outer core 120 is approximately the size and shape of the inner core 110 (e.g., displaced from the beam steered into the inner core 110 by an offset) and is under-sized with respect to the outer core 120, the beam immediately expands to fill the annular area of the outer core 120 when steered or otherwise launched into the outer core 120. Although the divergence of the beam may be essentially unchanged during the transition from the input fiber to the ring-shaped outer core 120, the larger diameter of the outer core 120 results in a rapid increase in the effective beam radius, whereby the BPP of the beam emanating from the outer core 120 will be at least three times higher than the BPP of the beam emanating from the inner core 110. The increase in BPP may significantly degrade the beam quality, as a beam with a low BPP (e.g., a small beam radius and a low divergence) typically focuses better and stays focused for a longer distance (e.g., is closer to an ideal beam). Accordingly, one challenge in high power variable or multi-state beam shaping applications is to avoid an excessive increase in the BPP when an input beam is simultaneously routed to a separate region in a waveguide via only an offset (e.g., by displacing the input beam by an offset).

Some implementations described herein relate to an all-fiber technique to convert between an offset-shaped beam guiding region and a ring-shaped or partial ring-shaped beam guiding region that can leave a central core undisturbed. For example, some implementations described herein enable an in-fiber conversion from an offset spot beam to an annulus or ring-shaped beam or a partial annulus, via an azimuthally tapered transition, thereby achieving a reduced BPP relative to an abrupt transition. For example, when a beam has an effective radius (e.g., a spatial extent or size) that gradually increases in size over a given distance or length (e.g., similar to an optical fiber taper), the divergence of the beam may gradually decrease as the effective radius of the beam increases over the given distance or length. For example, as used herein, the effective radius of an annular beam or an angular sector of an annular beam (e.g., a beam having a partial ring-shape) generally refers to the radius of a circle that has the same cross-sectional area as the annular beam or angular sector of an annular beam (e.g., in contrast to an actual beam radius measured as the outer radius of annulus). Accordingly, the decrease in the beam divergence may compensate the increase in the effective beam radius, resulting in a ring-shaped output beam or a partial ring-shaped output beam having a lower BPP relative to an abrupt transition in which the beam radius suddenly increases while the divergence remains relatively unchanged.

For example, as described in further detail herein, a waveguide may include an inner (or central) core to receive a first beam and one or more outer cores that concentrically surround the inner core to receive one or more respective beams that are displaced from the first beam by an offset. The outer core(s) may include a beam guiding region that rotationally expands over a length of the waveguide from a sector that is size-matched to the displaced offset beam(s) to an annulus that concentrically surrounds the inner core or a partial annulus that partially surrounds the inner core. For example, the beam guiding region may be defined by a set of one or more low refractive index features (e.g., one or more trenches, ablated regions, laser-processed regions, low refractive index rods, and/or the like) that have a varied orientation, shape, or azimuthal extent over the length of the waveguide. As such, the displaced offset beam(s) may enter the waveguide in a sector that is size-matched to the offset beam (e.g., approximately the same size as or slightly larger than the offset beam), and the displaced offset beam(s) may exit the waveguide as a ring-shaped beam or a partial ring-shaped beam. In this way, the geometry of the azimuthally tapered transition of the beam guiding region extends the capabilities of beam shaping systems that rely on beam shifting and/or beam displacement as an actuation mechanism. Furthermore, because divergence decreases correspondingly when the increase in the effective beam radius is gradual, some implementations described herein enable lower BPP states (enabling a higher beam quality) in a variable beam shaping system.

Figure 2A:
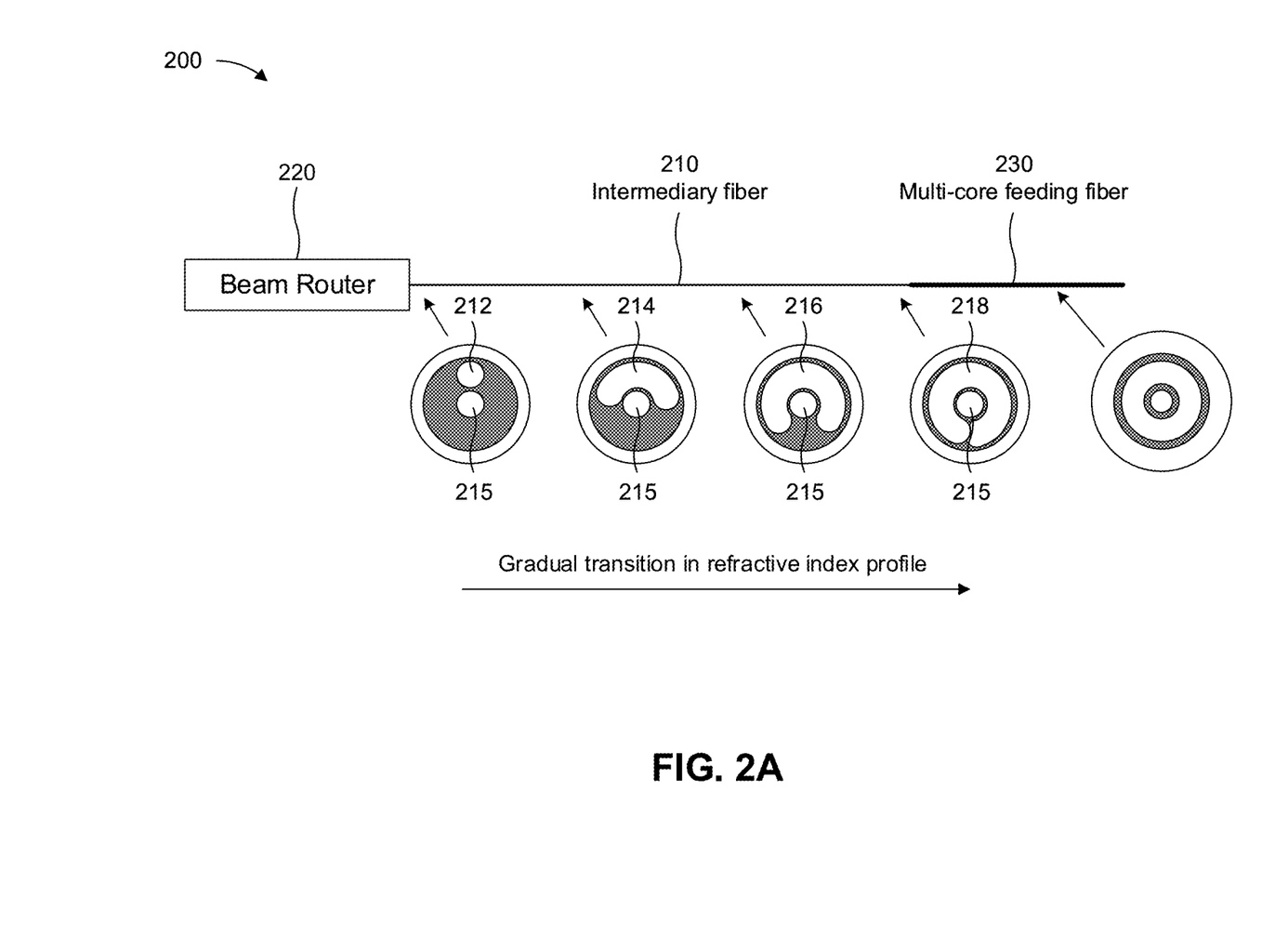
FIGS. 2A-2B are diagrams of one or more example implementations of a waveguide that includes a rotationally expanding beam guiding region in an outer core region.
Figure 2B:
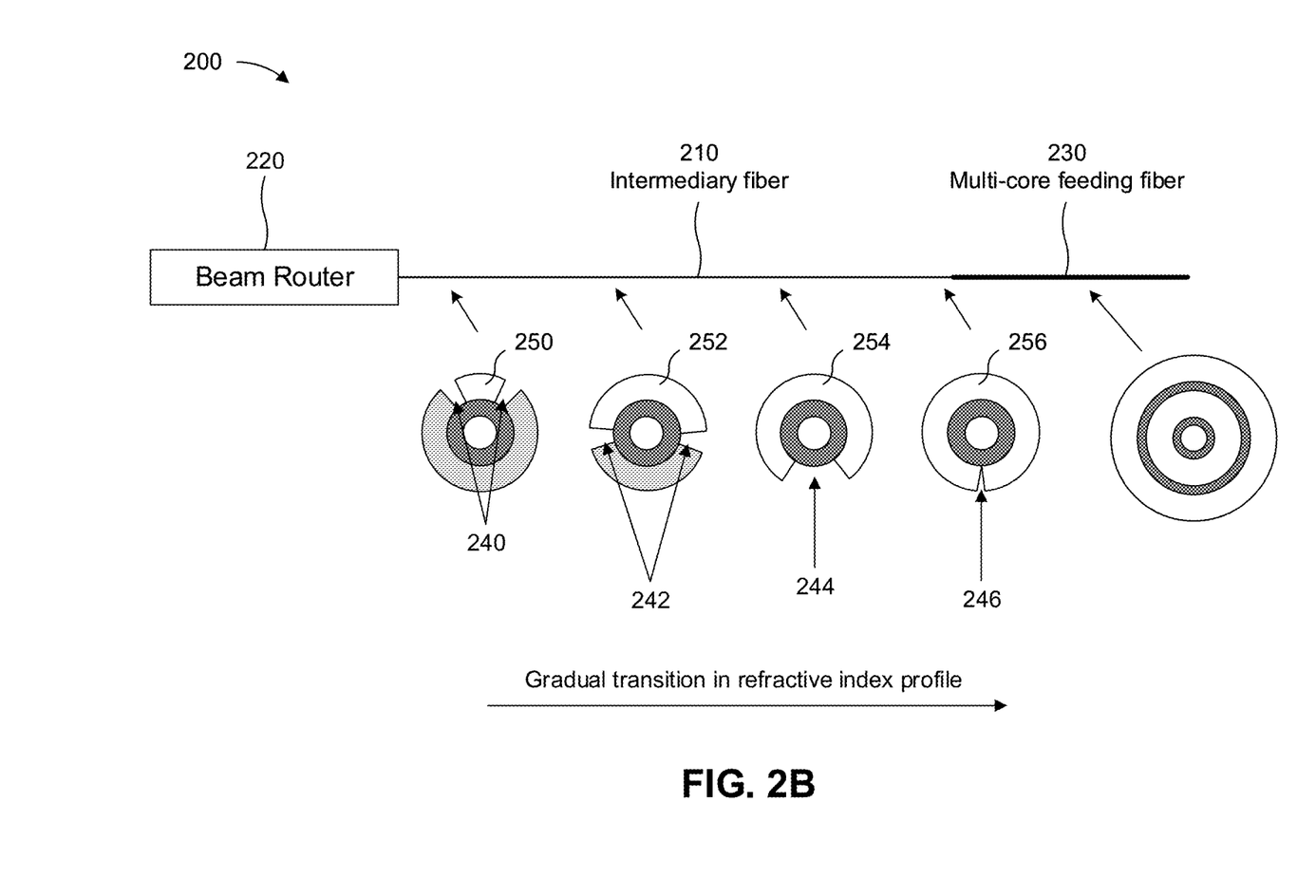

FIGS. 2A-2B are diagrams of one or more example implementations 200 of a waveguide that includes a rotationally expanding beam guiding region in an outer core region. For example, as shown in FIGS. 2A-2B, an optical system may include an intermediary fiber 210 coupled between a beam router 220 and a multi-core feeding fiber 230 (e.g., a dual-core feeding fiber including a central core and an outer core, as shown in FIG. 1, or a feeding fiber having a central core and multiple outer cores that concentrically surround the central core). In some implementations, the intermediary fiber 210 may act as an intermediary waveguide that can receive an offset beam from the beam router 220 and convert the offset beam into a ring-shaped beam (e.g., an annulus) or a partial ring-shaped beam (e.g., a partial annulus) via a gradual transition in a refractive index profile of the intermediary waveguide. The adiabatic transition in the intermediary fiber 210, similar to a fiber taper, increases a near-field size while correspondingly decreasing a far-field size. For example, as used herein, the term "adiabatic" may refer to a brightness-preserving property of the intermediary fiber 210 (e.g., as the effective radius of a beam transmitted through the intermediary fiber 210 increases, the beam divergence decreases proportionally such that the product of the effective beam radius and the beam divergence remains constant). Furthermore, as used herein, a "near-adiabatic" property may result in an effective beam radius and divergence having a product in a range from approximately 10% to approximately 50% higher than that of a purely adiabatic device.

As shown in FIG. 2A, the intermediary fiber 210 may include an inner (or central) core 215 arranged to receive a first beam from the beam router 220 and an outer core surrounding the inner core 215 and arranged to receive a second beam that the beam router 220 displaces from the first beam by an offset (e.g., in free space by use of a coupler box or a similar mechanism or in-fiber by applying bends to a particular fiber type). For example, in some implementations, the beam router 220 may deliver a beam to the intermediary fiber 210 in either a first beam path, through the inner (or central) core 215, or the beam router 220 may deliver the beam to the intermediary fiber 210 in a second beam path, through the outer core (e.g., one beam can be delivered in either of two beam paths, one of which is offset from the other). Alternatively, in some implementations, the beam router 220 may split a beam into two parts, including a first part that may be delivered to the intermediary fiber 210 in the first beam path and a second part that may be delivered to the intermediary fiber 210 in the second beam path. In either case, a spatial extent or size of an offset beam delivered to the outer core may gradually expand into a ring-shaped beam or a partial ring-shaped beam, while the spatial extent or size of the non-offset beam delivered to the inner core 215 is maintained. For example, as shown by reference numbers 212 through 218, the outer core includes a beam guiding region that rotationally expands over a length of the intermediary fiber 210 from a sector that is size-matched to the second (displaced offset) beam to an annulus that concentrically surrounds the inner core 215 (e.g., as shown by reference number 218) or a partial annulus that partially surrounds the inner core 215 (e.g., as shown by reference numbers 214 and 216). Accordingly, the second beam may generally be confined to the beam guiding region shown by reference numbers 212 through 218, whereby the effective radius of the second beam may gradually increase as the second beam gradually expands to fill the increasing area of the beam guiding region over the length of the intermediary fiber 210. Furthermore, in some implementations, the divergence half-angle of the second beam may gradually decrease as the effective beam radius increases, thereby conserving the BPP of the second beam (e.g., minimizing and/or reducing a rate at which the BPP of the second beam increases) as the second beam gradually transitions from an offset beam to an annulus or a partial annulus over the length of the intermediary fiber 210.

For example, as shown in FIG. 2A, the outer core of the intermediary fiber 210 includes a beam guiding region that gradually transitions from an offset core 212 that is size-matched to the (displaced) offset beam that may be received from the beam router 220 to a ring-shaped annulus 218 that concentrically surrounds the inner core 215 and is size-matched and shape-matched to a corresponding outer core of the multi-core feeding fiber 230. For example, as further shown in FIG. 2A, the beam guiding region includes intermediate regions 214, 216 between the offset core 212 and the ring-shaped annulus 218, where the intermediate regions 214, 216 have partial ring shapes that gradually increase in size over the length of the intermediary fiber 210. Furthermore, it will be appreciated that although FIG. 2A illustrates two intermediate regions 214, 216 between the offset core 212 and the ring-shaped annulus 218, the partial ring-shaped area of the beam guiding region may increase continuously or near-continuously over the length of the intermediary fiber 210 (e.g., intermediate regions 214, 216 merely represent two cross-sections of the intermediary fiber 210 at different points between the offset core 212 and the ring-shaped annulus 218, as shown by the diagonal arrows). Furthermore, it will be appreciated that although FIG. 2A illustrates an example in which the beam guiding region rotationally expands into a ring-shaped annulus 218 that concentrically surrounds the inner core 215, the beam building region may rotationally expand into a partial annulus that partially surrounds the inner core 215 (e.g., a final shape of the beam guiding region may be the shape shown for intermediate regions 214, 216 or another an intermediate state between the offset core 212 and the ring-shaped annulus 218).

Accordingly, in some implementations, the beam guiding region of the intermediary fiber 210 essentially forms a rotationally expanding taper that starts as an offset core 212 (e.g., a narrow sector size-matched to the displaced offset beam), and gradually expands and passes through intermediate regions 214, 216 with partial ring shapes that partially surround the inner core 215. Furthermore, in some implementations, the beam guiding region may eventually bridge to form the ring-shaped annulus 218 that concentrically surrounds the inner core 215, or the beam guiding region may not fully bridge to form a partial annulus that partially surrounds the inner core 215. Because the rotationally expanding taper can be adiabatic or near-adiabatic, modal mixing can be minimized, thereby causing the beam divergence to decrease as the effective beam radius (e.g., cross-sectional area, spatial extent, and/or size) increases over the length of the intermediary fiber 210. For example, in the case of a purely adiabatic transition, the divergence decreases inversely with the square root of the area occupied by the beam. In this way, as a result of the decrease in the beam divergence and the corresponding increase in the effective beam radius over the length of the intermediary fiber 210, a product of the beam divergence and the effective beam radius for the ring-shaped or partial ring-shaped beam that emanates from the outer core of the intermediary fiber 210 and/or the outer core of the multi-core feeding fiber 230 can be between 1× and 3× the BPP associated with the beam leaving the inner core 215 of the intermediary fiber 210 and/or the central core of the multi-core feeding fiber 230.

In some implementations, the technique shown in FIG. 2A, where the intermediary fiber 210 gradually transitions from the offset core 212 size-matched to the offset beam to the ring-shaped annulus 218 (or a partial annulus) size-matched and shape-matched to the outer core of the multi-core feeding fiber 230, can be used on many types of laser beams and end applications. For example, in some implementations, the input beam from the beam router 220 can be single-moded or multi-moded, and the input beam can be at any wavelength that is transparent to the material used in the intermediary fiber 210. In some implementations, example use cases for the intermediary fiber 210 with the gradually tapered beam guiding region may include single-moded or low multi-moded laser beams at an approximately 1 micron wavelength and ≥1 kW powers, with input BPPs ranging from 0.3 millimeters times milliradians (mm-mrad) to 10.0 mm-mrad, traveling in silica-based fibers. Furthermore, although only one offset-to-annulus or partial annulus transition is shown in FIG. 2A, in practice, any number of transitions could be made concentrically in the same fiber. For example, in addition to the inner or central core 215, the intermediary fiber 210 may include multiple outer cores concentrically surrounding the inner core 215, where each outer core includes a beam guiding region that rotationally expands from an offset core to a concentric ring or a partial ring around the inner core 215 (e.g., two or more offset cores that gradually transition into different concentric rings and/or partial rings around the inner core 215). Further, the offset between the inner core 215 and the offset sector 212 can be chosen in tandem with the dimensions of the multi-core feeding fiber 230 in order to achieve an annular beam or a partially annular beam with a desired ratio of ring diameter to ring width. For example, in some implementations, the offset sector 212 may be located relatively farther away from the inner core 215 in order to produce a thinner ring or partial ring, which may be useful in cutting and/or welding applications, among other examples.

In general, as described above, FIG. 2A illustrates an intermediary fiber 210 that includes an inner core 215 and one or more outer cores that each have a beam guiding region that rotationally expands in a continuous or near-continuous manner over the length of the intermediary fiber 210. In practice, however, fabricating the beam guiding region to rotationally expand in a continuous manner may be challenging because the intermediary fiber 210 is a rotationally asymmetric waveguide. Accordingly, as described in further detail below with reference to FIGS. 3A-3C, one or more fabrication techniques can be used to form the rotationally expanding beam guiding region by forming, in the outer core(s) of the intermediary fiber 210, a set of one or more low refractive index features that have a varied orientation or a varied shape or size over the length of the intermediary fiber 210. For example, in some implementations, the one or more low refractive index features may be formed in the outer core of the intermediary fiber 210 via material ablation (e.g., where material is removed from the outer core over the length of the intermediary fiber 210 via laser machining, as described in further detail below with reference to FIG. 3A, or via or selective etching, as described in further detail below with reference to FIG. 3B). Additionally, or alternatively, the one or more low refractive index features may be formed by processing the outer core of the intermediary fiber 210 using a femtosecond laser, an ultraviolet laser, or another suitable device such that a refractive index profile of the outer core transitions adiabatically or near-adiabatically over the length of the intermediary fiber 210. Additionally, or alternatively, as described in further detail below with reference to FIG. 3C, the one or more low refractive index features may be formed at a preform stage by drilling or cutting into the outer core and inserting a first low refractive index feature (e.g., a first stirring rod having a low refractive index), imposing twist on the preform, and then drilling or cutting into the twisted preform and inserting a second low refractive index feature (e.g., a second stirring rod).

For example, FIG. 2B illustrates an example implementation in which the set of low refractive index features are formed as trenches in the outer core of the intermediary fiber 210 via material ablation (e.g., via laser machining, as described in further detail below with reference to FIG. 3A, or via or selective etching, as described in further detail below with reference to FIG. 3B). For example, as shown by reference numbers 250, 252, 254, and 256, the intermediary fiber 210 is configured as a waveguide having a beam guiding region that gradually and rotationally expands over the length of the intermediary fiber 210. As further shown by reference numbers 240, 242, 244, and 246, the beam guiding region is formed in the outer core and is defined on two sides by a pair of low refractive index features that have a varied orientation over the length of the intermediary fiber 210. Alternatively, the beam guiding region may be defined by a single low refractive index feature that has a varied shape over the length of the intermediary fiber 210. For example, in some implementations, the single low refractive index feature may be formed by machining away all of the material in the outer core except the material forming the beam guiding region, such that the low refractive index feature changes shape over the length of the intermediary fiber 210 (e.g., the low refractive index feature starts as a wide sector of a ring that complements the offset sector 250, gradually transitions in shape to form the sliver 246 that complements the partial annulus shown by reference number 256, and may eventually disappear such that the beam guiding region ends as an annulus). In this way, the waveguide can controllably transition from a narrow sector (approximately confining the launched laser beam) to an annulus or a partial annulus by varying the orientation(s) and/or shape(s) of the low refractive index feature(s) over the length of the intermediary fiber 210. For example, as shown in FIG. 2B, and by reference number 240, the set of low refractive index features may include a pair trenches or a machined-away region initially formed to approximately confine the laser beam launched into the outer core of the intermediary fiber 210 to a narrow beam guiding region 250 that is size-matched to the launched laser beam. As further shown in FIG. 2B, and by reference number 242, the low refractive index feature(s) may wrap around the outer core symmetrically (e.g., at a particular rate) or asymmetrically (e.g., at different rates, or with one low refractive index features at a fixed position in cases where there are multiple low refractive index features), whereby the beam guiding region has a partial ring shape that gradually grows, as shown by reference number 252. As further shown in FIG. 2B, and by reference number 244, the low refractive index features may eventually meet and merge before tapering away to form a ring or annulus, as shown by reference number 246. Alternatively, in some implementations, the low refractive index features may not meet and/or taper away (e.g., due to fabrication obstacles), in which case a final shape of the beam guiding region may be a partial ring or partial annulus. In this way, the beam guiding region of the waveguide controllably transitions to an increasingly larger partial ring shape, as shown by reference number 254, and may eventually form an annulus that is size-matched and shape-matched to the multi-core feeding fiber 230, as shown by reference number 256. In some implementations, the low refractive index features may be machined and left as air, or may be re-sleeved with a low refractive index glass or another suitable material.

The number and arrangement of components shown in FIGS. 2A-2B are provided as examples. In practice, there may be additional components, fewer components, different components, or differently arranged components than shown in FIGS. 2A-2B. Furthermore, two or more components shown in FIGS. 2A-2B may be implemented within a single component, or a single component shown in FIGS. 2A-2B may be implemented as multiple, distributed components. Additionally, or alternatively, a set of components shown in FIGS. 2A-2B may perform one or more functions described as being performed by another set of components shown in FIGS. 2A-2B.

Figure 3A:
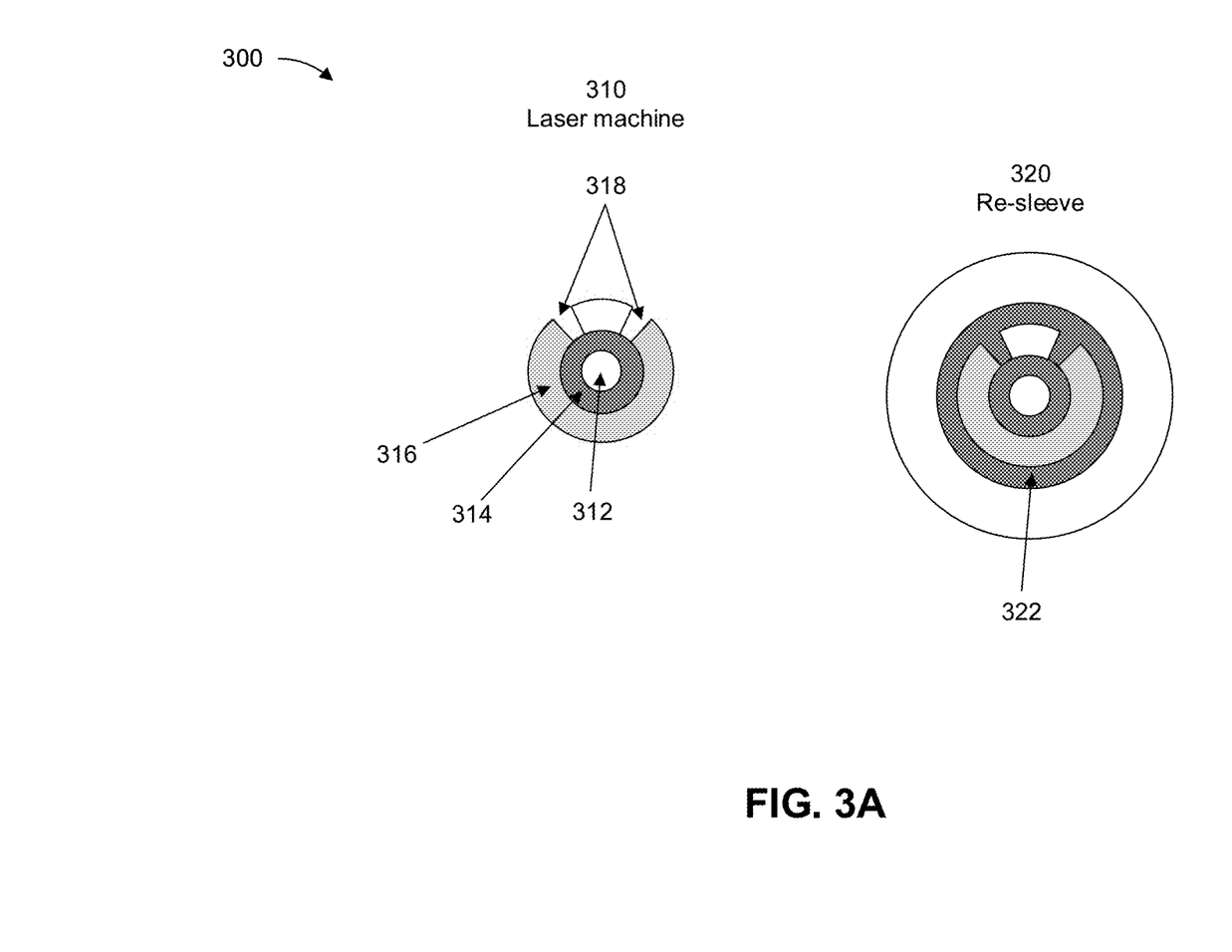
FIGS. 3A-3C are diagrams of one or more example techniques for fabricating a waveguide that includes a rotationally expanding beam guiding region in an outer core region.
Figure 3B:
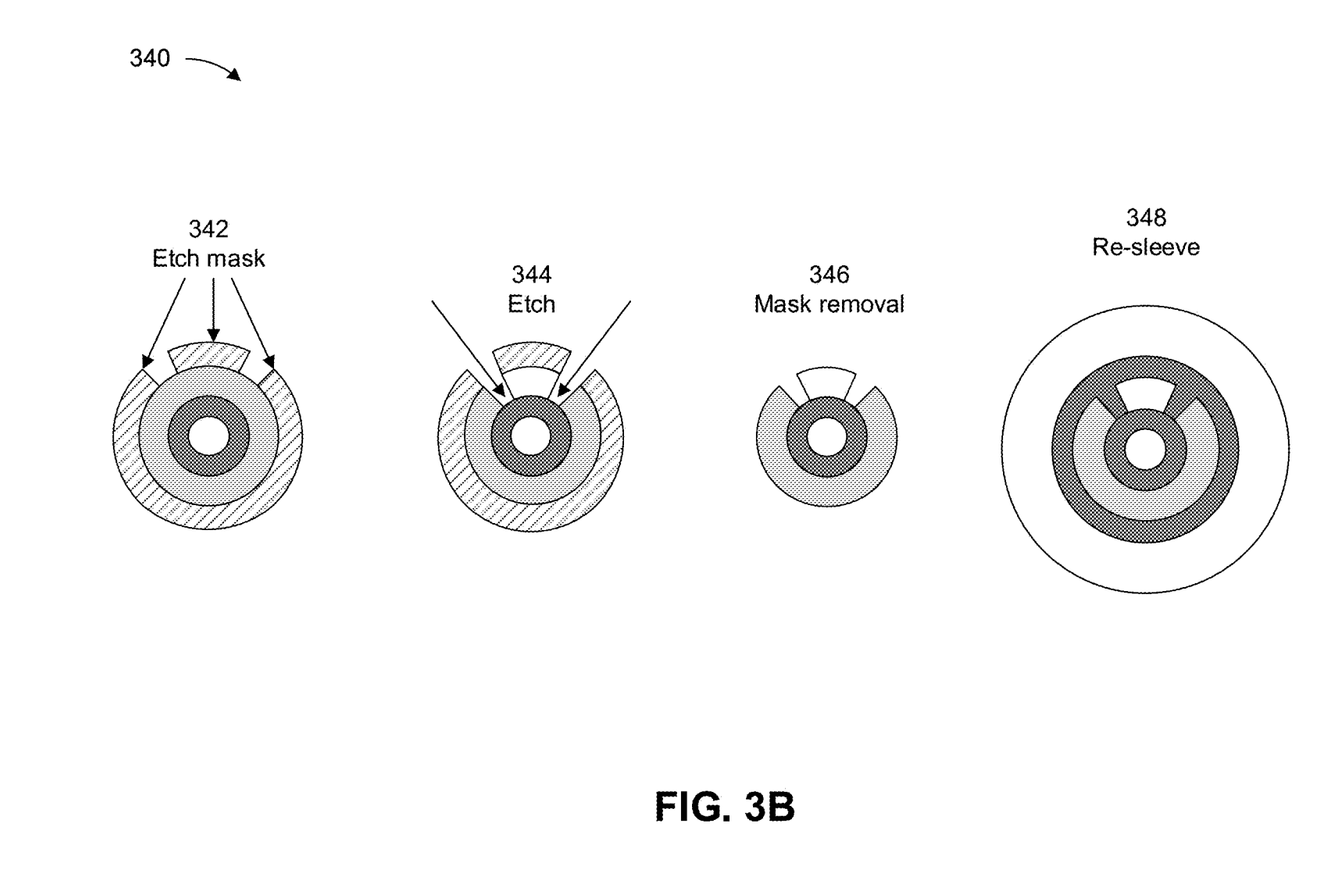
Figure 3C:
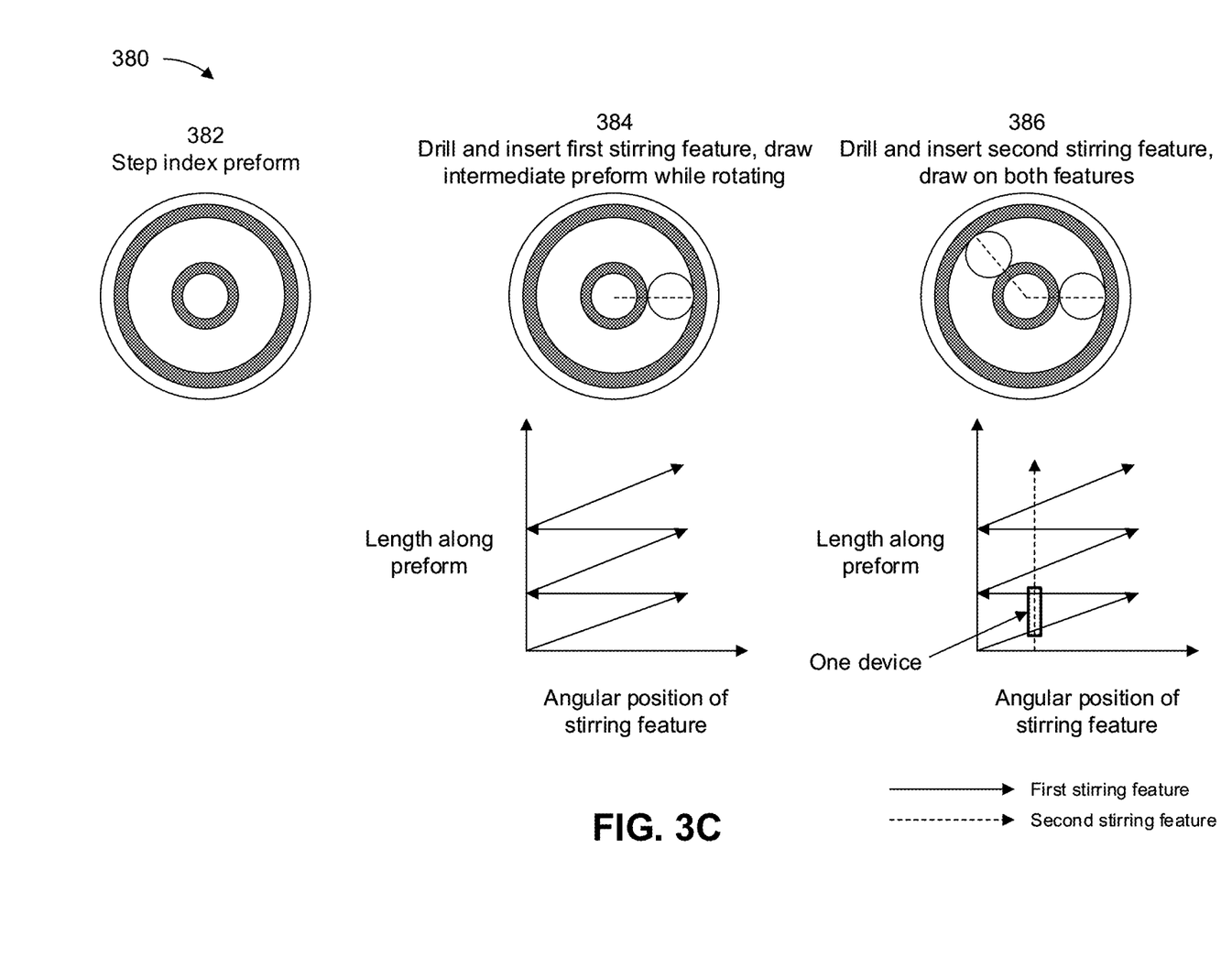

FIGS. 3A-3C are diagrams of one or more examples 300, 340, 380 for fabricating a waveguide that includes a rotationally expanding beam guiding region in an outer core region. For example, as described herein, the waveguide may be an optical fiber that includes an inner or central core and one or more outer cores, where the central core is arranged to receive a first input beam and the one or more outer cores are each arranged to receive an offset beam (e.g., an input beam that has the same properties as the first input beam, such as size and shape, but is displaced from the first input beam by an offset). Accordingly, the one or more outer cores may each include a beam guiding region that gradually transitions from an offset core relatively size-matched to a corresponding offset beam to an annulus or a partial annulus core that is better size-matched and shape-matched to an annular section of a multi-core feeding fiber. As described herein, the waveguide is not rotationally symmetric, whereby example 300, 340, 380 illustrate different techniques to create one or more low refractive index features in the one or more outer cores to define the beam guiding region of the waveguide. For example, starting from a rotationally symmetric fiber or preform (e.g., a structure that has not been drawn down to final fiber dimensions), example 300 in FIG. 3A illustrates a first material ablation technique to form the one or more low refractive index features using micromachining (e.g., using a carbon dioxide ($CO_2$) laser and/or a femtosecond laser machine), example 340 in FIG. 3B illustrates a second material ablation technique to form the one or more low refractive index features using selective etching, and example 380 in FIG. 3C illustrates a technique to form the low refractive index features at a preform stage. Accordingly, as described herein, examples 300, 340, 380 illustrate various suitable techniques to fabricate an intermediary fiber or waveguide that is not rotationally symmetric.

For example, as shown in FIG. 3A, and by reference number 310, laser machining may be performed on a rotationally symmetric fiber or a rotationally symmetric preform that includes a central core 312 and an internal low-index cladding layer 314 concentrically surrounded by a second core 316. In some implementations, longitudinally-oriented trenches 318 may be machined into the second core 316 by micromachining (e.g., using laser ablation and/or laser material processing by a $CO_2$ laser and/or a femtosecond laser, among other examples). In some implementations, the trenches 318 may be micromachined to penetrate the second core 316 to within a few microns of the cladding layer 314 that surrounds the central core 312 or all the way to the cladding layer 314. The trenches 318, in addition to an external interface at an outer edge of the second core 316, and the low-index cladding layer 314 surrounding the central core 312, may define a waveguide that resembles an offset-core fiber. Alternatively, in some implementations, all material in the second core 316 may be machined away (e.g., including the entire lightly shaded area in FIG. 3A) such that the only remaining material in the second core 316 is the material forming the beam guiding region. Furthermore, in some implementations, flame processing, wet-etching, dry-etching, and/or another suitable technique may be used to round the beam guiding region produced by the laser machining to more closely resemble an offset-rounded core. In some implementations, the laser machining may be supplemented by further processes to improve the shape or manufacturability of the structure (e.g., using laser heating or chemical etching to smooth or reshape the surfaces of the trenches 318 and/or the material forming the beam guiding region).

As further shown in FIG. 3A, and by reference number 320, the structure produced by the laser machining may be re-sleeved in a tube with a low-index inner layer 322, or a layer of low-index material can be deposited from vapor phase. In either case, the low-index material may fill in the trenches 318 (or machined-away region) to form one low refractive index feature or a pair of low refractive index features in an all-glass structure with no external air interface for the beam. Either concurrently with the re-sleeving, or as a final fabrication step, the waveguide structure may be drawn down to final dimensions. Additionally, or alternatively, in some implementations, more than two low refractive index features may be formed in the second core 316 to define additional waveguide sections (e.g., to gradually transition each of two input beams from a spot into a half-annulus and/or to gradually transition each of multiple input beams from a spot into a partial annulus, among other examples).

In some implementations, because the waveguide is defined on two sides by the low refractive index material that fills the micromachined trenches 318 (or machined-away region(s)), the waveguide can controllably transition from a narrow sector (approximately confining the launched laser beam) to a ring or a partial ring by varying the orientation and/or shape of the one or more low refractive index features over the length of the fiber. For example, as described above with reference to FIG. 2B, a pair of trenches 318 may initially be formed to approximately confine the launched laser beam to a narrow beam guiding region and one or more of the trenches 318 may wrap around the core such that the beam guiding region gradually grows. Accordingly, the pair of trenches 318 may eventually meet and merge before tapering away such that the waveguide controllably transitions to a ring or annulus that is size-matched and shape-matched to a feeding fiber. Alternatively, the pair of trenches 318 may not fully meet such that the waveguide controllably transitions to a partial ring or partial annulus. Alternatively, in cases where a single low refractive index feature is formed by machining away all material except the beam guiding region, the amount of material that is machined away may gradually decrease over the length of the fiber such that the machined away region starts as a wide sector of a ring that complements the offset sector and gradually transitions in shape to form a partial ring that complements a partial annular shape of the beam guiding region. Furthermore, in some implementations, the machined away region may eventually disappear in cases where the beam guiding region ends as an annulus.

In some implementations, the process of transitioning the orientation and/or shape of the low refractive index features may be controlled by the laser machining, and the active length of the device over which the orientation and/or shape of the low refractive index features rotate can be controlled. To provide an adiabatic or near-adiabatic transition with high brightness efficiency, the active length should be at least 1 mm, and more preferably 10-50 mm. Active lengths greater than 50 mm may be useful in some applications as well, for example with large diameter beams or in high-skew designs. In cases where the one or more low refractive index features are formed as two or more trenches 318, the orientation of the trenches 318 could change asymmetrically (e.g., a first trench 318 moves at a first rate and a second trench 318 moves at a different rate, or not at all), or all of the trenches 318 may change symmetrically (e.g., as shown in FIG. 2B). Additionally, in some implementations, the entire structure may rotate to impart skew (e.g., angular momentum or rotary character). For example, the beam guiding region may evolve in shape, but no skew is introduced because the waveguide does not rotate (e.g., 12 o'clock is always the azimuthal "center" of the outer waveguide, such that the azimuthal center of the outer core is fixed over the length of the waveguide). Alternatively, in some implementations, rotation may be introduced by fabricating the one or more low refractive index features over a stretched spiraling trajectory, or by post-processing with a flame, in which case the azimuthal center of the outer core may rotate over the length of the waveguide. In this way, controllable skew may be introduced to the beam launched into the beam guiding region of the outer core, enabling independent BPP control at a constant beam size. In this way, the waveguide may be configured to deliver beams that have a high brightness and no skew, or to deliver skewed beams that have a slightly lower brightness.

In some implementations, FIG. 3B illustrates an example 340 of using selective etching (e.g., via a spatially selective etch mask) to fabricate a waveguide having a rotationally expanding beam guiding region that gradually transitions to an annulus or ring-shaped core. For example, as shown in FIG. 3B, and by reference number 342, an etch mask that resists an etchant (e.g., hydrofluoric (HF) acid) may be applied to a portion or an entirety of the rotationally symmetric fiber or preform structure. For example, the etch mask may be a photoresist used in semiconductor processing. In some implementations, the etch mask may be processed optically to remove selective materials of the etch mask, and areas of the etch mask that are removed may expose glass to the etchant material (e.g., HF acid) when placed in an acid bath, allowing spatially selective material removal, as shown by reference number 344. As further shown by reference number 346, the etch mask may be removed after the selective etching, and as further shown by reference number 348, the structure may be re-sleeved and/or drawn down in a similar manner as described above with reference to FIG. 3A. Furthermore, in some implementations, the etch mask 342 may be patterned to form the set of low refractive index features as a pair of trenches (e.g., as shown in FIG. 3B), or the etch mask 342 may be patterned to expose all areas of the outer core to the etchant material except a portion of the outer core that defines the beam guiding region (e.g., in the case of a single low refractive index feature).

While the foregoing description of the selective etching method uses an etch mask and spatially selective material removal via an acid bath, positive and/or negative photolithography may be performed to remove material in a spatially selective manner depending on the material system. Additionally, or alternatively, dopant-dependent etching may be performed, in which case the waveguide structure may be fabricated from a customized preform that includes spatially selective concentrations of particular dopants to enhance or suppress etching rates. As an alternative to using an etch mask, the glass to be etched may be sensitized locally (e.g., by exposure to a femtosecond laser).

In some implementations, rather than performing laser processing or selective etching to form the low refractive index features by material ablation (e.g., as shown in FIGS. 3A-3B), the fiber may be processed to locally change the refractive index (e.g., using a femtosecond or ultraviolet laser tuned to cause a refractive-index shift rather than material ablation). Depending on whether the refractive-index modification process causes an increase or a decrease in the refractive index, the structure that is processed to locally change the refractive index and thereby form the low refractive index features could either be the outer core tapered guiding region, or the two trench-shaped boundaries, respectively. Furthermore, in some cases, such refractive-index modification may be performed inside of bulk material rather than only on a surface, whereby the starting material could be a fully re-sleeved part similar to the re-sleeved structure shown by reference number 320 in FIG. 3A and/or reference number 348 in FIG. 3B. In this case, the outer core structure may be inscribed as a final step after the fiber is fully drawn.

In some implementations, FIG. 3C illustrates an example 380 of a technique to fabricate a waveguide having a rotationally expanding beam guiding region that gradually transitions to an annulus or a partial annulus at a preform stage. For example, as shown in FIG. 3C, and by reference number 382, a starting structure for fabricating the waveguide may be a step index preform that has a first (central) core, a ring-shaped outer core concentrically surrounding the central core, and an internal cladding layer at an interface between the central core and the ring-shaped outer core. As further shown in FIG. 3C, and by reference number 384, a first hole may be drilled, cut, or otherwise formed in the ring-shaped outer core, and a first low refractive index feature (e.g., a first stirring feature, such as a first low refractive index rod) may be inserted into the first hole. Accordingly, twist may then be imposed on the preform such that the angular position of the first low refractive index feature varies in orientation over the length of the preform. As further shown in FIG. 3C, and by reference number 386, a second hole may be drilled, cut, or otherwise formed in the twisted preform, and a second low refractive index feature (e.g., a second stirring feature, such as a second low refractive index rod) may be inserted into the second hole. The twisted preform may then be drawn with or without rotation on both the first and the second low refractive index features, thereby creating a rotationally expanding beam guiding region using low-refractive index features that rotate around the center of the preform at different rates.

Although FIGS. 3A-3C show example fabrication steps to make a waveguide defined by one or more low refractive index features that have a varied orientation over a length of the waveguide, in some implementations, the waveguide may be made include additional fabrication steps, fewer fabrication steps, different fabrication steps, or differently arranged fabrication steps than depicted in FIGS. 3A-3C. Additionally, or alternatively, two or more fabrication steps shown in FIGS. 3A-3C may be performed in parallel.

Figure 4:
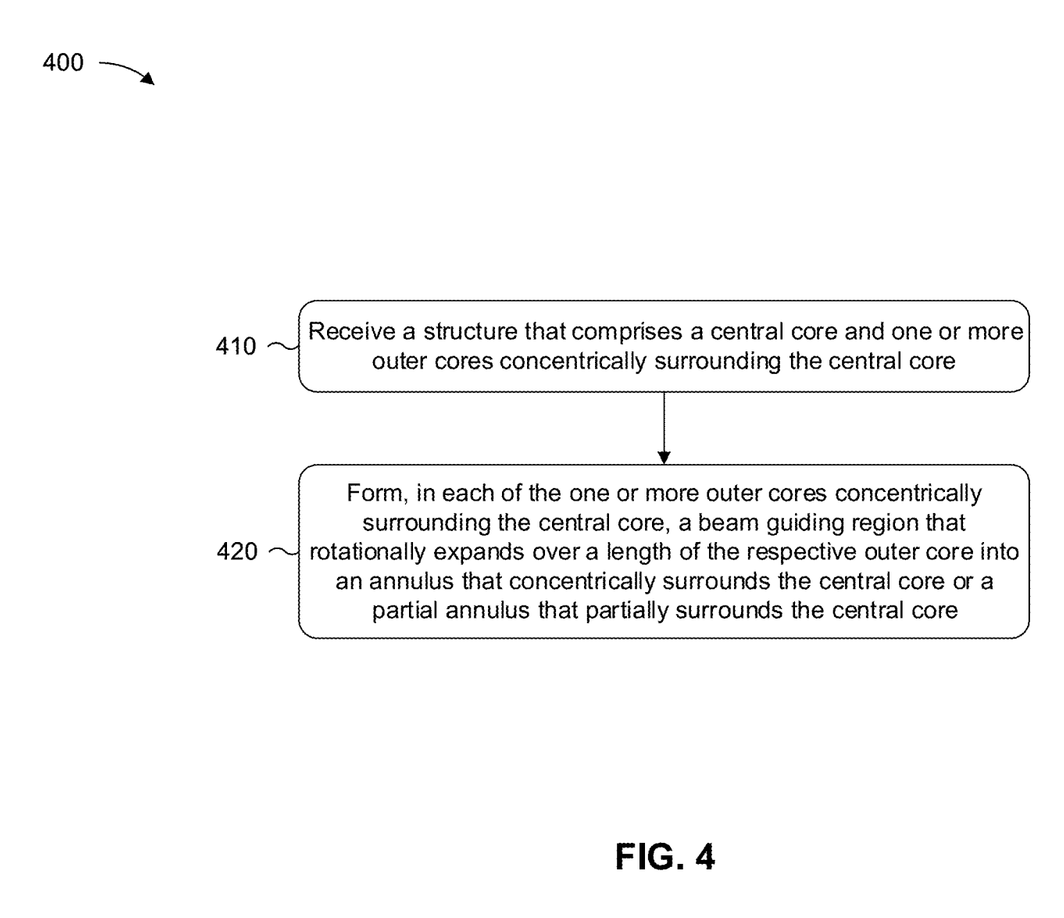
FIG. 4 is a flowchart of an example process relating to fabricating a waveguide that includes a rotationally expanding beam guiding region in an outer core region.

FIG. 4 is a flowchart of an example process 400 relating to fabricating a waveguide that includes a rotationally expanding beam guiding region in an outer core region.

As shown in FIG. 4, process 400 may include receiving a structure that comprises a central core and one or more outer cores concentrically surrounding the central core (block 410). In some implementations, the structure comprises a rotationally symmetric fiber or preform.

As further shown in FIG. 4, process 400 may include forming, in each of the one or more outer cores concentrically surrounding the central core, a beam guiding region that rotationally expands over a length of the respective outer core into an annulus that concentrically surrounds the central core or a partial annulus that partially surrounds the central core (block 420).

Process 400 may include additional implementations, such as any single implementation or any combination of implementations described below and/or in connection with one or more other processes described elsewhere herein.

In a first implementation, forming the beam guiding region comprises performing material ablation to form, in each of the one or more outer core, a set of low refractive index features that have a varied orientation or a varied shape over the length of the respective outer core.

In a second implementation, alone or in combination with the first implementation, performing the material ablation comprises performing laser machining or selective etching to form the set of low refractive index features by removing material over the length of the respective outer core.

In a third implementation, alone or in combination with one or more of the first and second implementations, forming the beam guiding region further comprises rounding one or more low refractive index features included in the set of low refractive index features using flame processing or etching.

In a fourth implementation, alone or in combination with one or more of the first through third implementations, forming the beam guiding region comprises twisting the structure after inserting a first low refractive index feature into a first hole formed in the one or more outer cores of the structure, and inserting a second low refractive index feature into a second hole formed in the one or more outer cores after the structure has been twisted.

In a fifth implementation, alone or in combination with one or more of the first through fourth implementations, forming the beam guiding region comprises processing the one or more outer cores using a femtosecond laser or an ultraviolet laser tuned to cause a refractive index profile of the one or more outer cores to transition adiabatically or near-adiabatically over the length of the one or more outer cores.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A waveguide, comprising:
   an inner core arranged to receive a first beam; and
   an outer core surrounding the inner core and arranged to receive a second beam that is displaced from the first beam by an offset,
      wherein the outer core comprises a beam guiding region that rotationally expands over a length of the waveguide into an annulus that concentrically surrounds the inner core or a partial annulus that partially surrounds the inner core.

2. The waveguide of claim 1, wherein the beam guiding region is defined by a set of low refractive index features that have a varied orientation or a varied shape over the length of the waveguide.

3. The waveguide of claim 2, wherein the waveguide is configured to confine the second beam to the beam guiding region defined by the set of low refractive index features when the second beam travels through the waveguide.

4. The waveguide of claim 2, wherein the varied orientation or the varied shape of the set of low refractive index features causes the second beam to enter the waveguide as an offset beam and to exit from the waveguide as a ring-shaped beam or a partial ring-shaped beam.

5. The waveguide of claim 2, further comprising:
   a cladding layer between the inner core and the outer core,
      wherein the beam guiding region is further defined by the cladding layer and an external interface at an edge of the outer core.

6. The waveguide of claim 1, wherein the second beam emanates from the waveguide as a ring-shaped beam or a partial ring-shaped beam having a beam parameter product (BPP) that is less than or equal to three times a BPP of the first beam emanating from the inner core.

7. The waveguide of claim 1, wherein a divergence of the second beam decreases as an area of the beam guiding region increases over the length of the waveguide.

8. The waveguide of claim 1, wherein an azimuthal center of the outer core is fixed over the length of the waveguide.

9. The waveguide of claim 1, wherein an azimuthal center of the outer core rotates over the length of the waveguide.

10. An optical system, comprising:
a beam router configured to generate one or more of a first beam or at least one second beam that is displaced from the first beam by an offset;
a feeding fiber comprising an inner core to transmit the first beam and at least one annular outer core concentrically surrounding the inner core to transmit the at least one second beam; and
an intermediary waveguide arranged between the beam router and the feeding fiber, wherein the intermediary waveguide comprises:
an inner core arranged to receive the first beam; and
at least one outer core surrounding the inner core and arranged to receive the at least one second beam that is displaced from the first beam by the offset,
wherein the at least one outer core of the intermediary waveguide comprises a beam guiding region that rotationally expands over a length of the intermediary waveguide into an annulus that concentrically surrounds the inner core or a partial annulus that partially surrounds the inner core.

11. The optical system of claim 10, wherein the intermediary waveguide further comprises:
a cladding layer between the inner core and the at least one outer core,
wherein the beam guiding region is defined by an area between the cladding layer, an external interface at an edge of the at least one outer core, and a set of low refractive index features that have a varied orientation or a varied shape over the length of the waveguide.

12. The optical system of claim 11, wherein the varied orientation or the varied shape of the set of low refractive index features causes the at least one second beam to enter the intermediary waveguide as an offset beam and to emanate from the intermediary waveguide as a ring-shaped beam or a partial ring-shaped beam that is size-matched and shape-matched to the at least one annular outer core of the feeding fiber.

13. The optical system of claim 10, wherein the at least one outer core of the intermediary waveguide has a refractive index profile that transitions adiabatically or near-adiabatically over the length of the intermediary waveguide.

14. The optical system of claim 10, wherein a divergence of the at least one second beam decreases as an area of the beam guiding region increases over the length of the intermediary waveguide.

15. A method for fabricating a waveguide, comprising:
receiving a structure that comprises a central core and one or more outer cores concentrically surrounding the central core,
wherein the structure comprises a rotationally symmetric fiber or preform; and
forming, in each of the one or more outer cores concentrically surrounding the central core, a beam guiding region that rotationally expands over a length of the respective outer core into an annulus that concentrically surrounds the central core or a partial annulus that partially surrounds the central core.

16. The method of claim 15, wherein forming the beam guiding region comprises:
performing material ablation to form, in each of the one or more outer core, a set of low refractive index features that have a varied orientation or a varied shape over the length of the respective outer core.

17. The method of claim 16, wherein performing the material ablation comprises:
performing laser machining or selective etching to form the set of low refractive index features by removing material over the length of the respective outer core.

18. The method of claim 16, wherein forming the beam guiding region further comprises:
rounding one or more low refractive index features included in the set of low refractive index features using flame processing or etching.

19. The method of claim 15, wherein forming the beam guiding region comprises:
twisting the structure after inserting a first low refractive index feature into a first hole formed in the one or more outer cores of the structure; and
inserting a second low refractive index feature into a second hole formed in the one or more outer cores after the structure has been twisted.

20. The method of claim 15, wherein forming the beam guiding region comprises:
processing the one or more outer cores using a femtosecond laser or an ultraviolet laser tuned to cause a refractive index profile of the one or more outer cores to transition adiabatically or near-adiabatically over the length of the one or more outer cores.

* * * * *